United States Patent
Kumar

(10) Patent No.: US 10,162,768 B2
(45) Date of Patent: Dec. 25, 2018

(54) DISPLAY SYSTEM EMPLOYING APPLICATIONS AND OPERATING SYSTEM(S) LOADED FROM DETACHABLE DEVICE USING INTERNAL PROCESSOR OF DISPLAY DEVICE OR EXTERNAL PROCESSOR OF DETACHABLE DEVICE

(71) Applicant: Advanced Micro Devices, Inc., Sunnyvale, CA (US)

(72) Inventor: Sirish G. Kumar, Visakhapatnam (IN)

(73) Assignee: Advanced Micro Devices, Inc., Sunnyvale, CA (US)

(*) Notice: Subject to any disclaimer, the term of this patent is extended or adjusted under 35 U.S.C. 154(b) by 101 days.

(21) Appl. No.: 14/530,929

(22) Filed: Nov. 3, 2014

(65) Prior Publication Data
US 2016/0124871 A1 May 5, 2016

(51) Int. Cl.
| | | |
|---|---|---|
| *G06F 13/10* | (2006.01) | |
| *G06F 13/40* | (2006.01) | |
| *G06F 9/445* | (2018.01) | |
| *G06F 9/4401* | (2018.01) | |
| *H04L 29/08* | (2006.01) | |
| *G06F 9/50* | (2006.01) | |
| *G06F 3/14* | (2006.01) | |

(52) U.S. Cl.
CPC ............ *G06F 13/102* (2013.01); *G06F 9/445* (2013.01); *G06F 13/4081* (2013.01); *G06F 3/14* (2013.01); *G06F 9/4406* (2013.01); *G06F 9/5055* (2013.01); *H04L 67/303* (2013.01)

(58) Field of Classification Search
CPC ..... H04L 67/303; G06F 9/5055; G06F 13/102
USPC ............ 711/103; 710/8–10, 72, 73; 709/203
See application file for complete search history.

(56) References Cited

U.S. PATENT DOCUMENTS

| | | | | | |
|---|---|---|---|---|---|
| 7,747,683 | B2 * | 6/2010 | Kurianski | ............. | H04L 67/303 709/203 |
| 8,117,362 | B2 * | 2/2012 | Rodriguez | ............ | G06F 13/385 710/10 |
| 8,527,679 | B2 * | 9/2013 | Suh | ........................ | G06F 9/5055 710/10 |
| 8,961,318 | B2 * | 2/2015 | Liber | ...................... | G07F 17/32 463/25 |
| 2006/0205359 | A1 * | 9/2006 | Brooks | ................ | H04M 1/7253 455/73 |
| 2010/0077396 | A1 * | 3/2010 | Choi | ....................... | G06F 9/441 718/1 |
| 2012/0182247 | A1 * | 7/2012 | Ditzik | ................. | A47B 21/0073 345/173 |
| 2013/0241839 | A1 * | 9/2013 | Walker | ................ | G06F 3/04845 345/173 |
| 2013/0258195 | A1 * | 10/2013 | Chung | ................ | H04N 21/4183 348/554 |
| 2014/0049469 | A1 * | 2/2014 | Bragin | ................ | G06F 3/03547 345/161 |

* cited by examiner

*Primary Examiner* — Tammara R Peyton
(74) *Attorney, Agent, or Firm* — Volpe and Koenig, P.C.

(57) ABSTRACT

A method, a device, and a non-transitory computer readable medium for performing external processing on a display device are presented. An application is executed on the display device. Data is sent from the application to an external processor in direct communication with the display device, if the application requires additional processing capabilities than is available on the display device. Data is received from the external processor and the processed data is displayed on the display device.

14 Claims, 4 Drawing Sheets

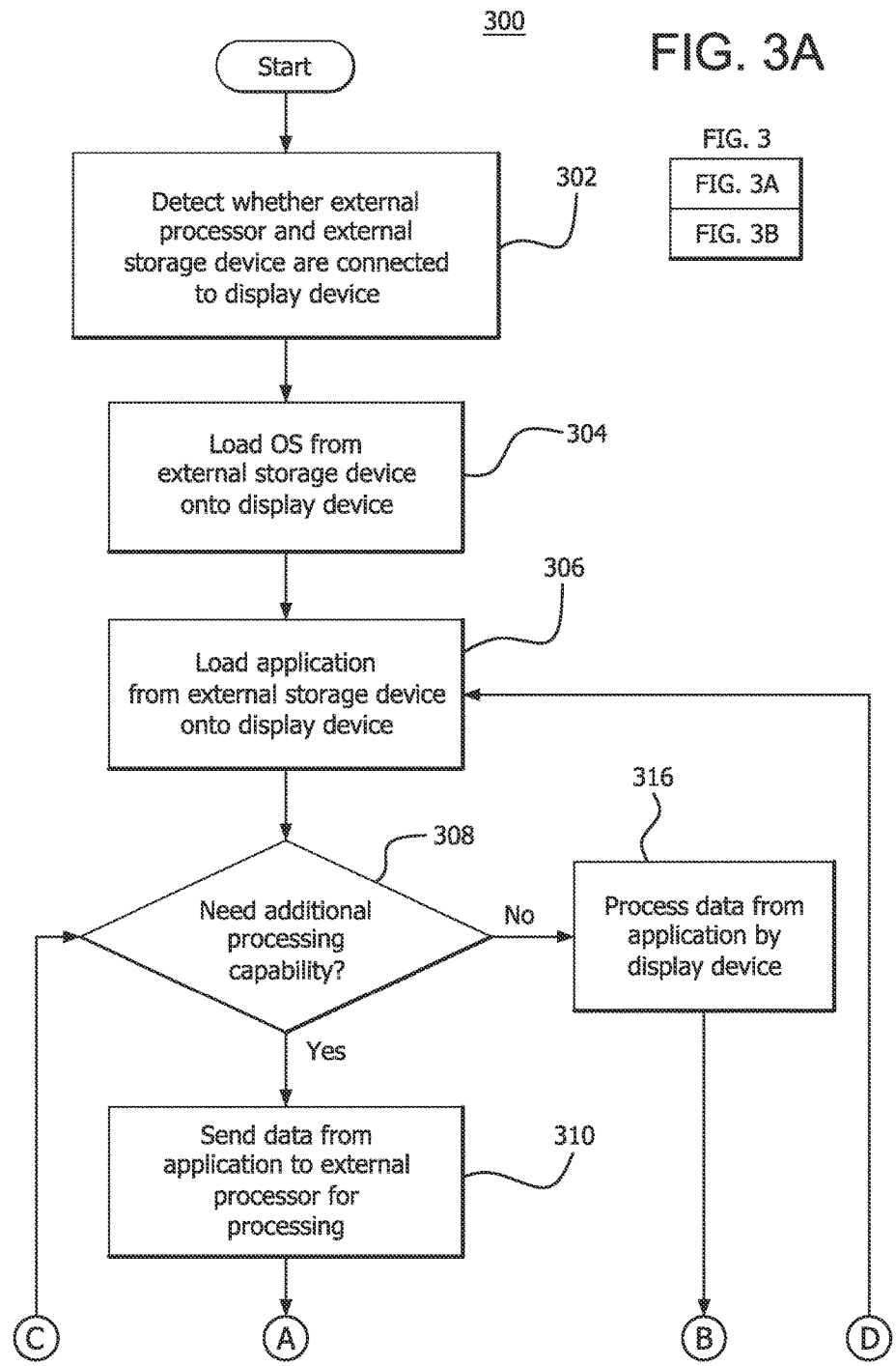

DISPLAY SYSTEM EMPLOYING APPLICATIONS AND OPERATING SYSTEM(S) LOADED FROM DETACHABLE DEVICE USING INTERNAL PROCESSOR OF DISPLAY DEVICE OR EXTERNAL PROCESSOR OF DETACHABLE DEVICE

TECHNICAL FIELD

The present invention is generally directed to data processing, and in particular, to an external device for providing data processing capabilities to a display device to which the external device is connected.

BACKGROUND

Some currently available televisions (TVs), for example "Smart TVs," integrate Internet connectivity into the TV and may include applications that utilize the Internet connectivity, for example, Facebook™, Twitter™, and YouTube™. Such applications are generally "simple," in that they do not require much processing power. Based on the limited processing power of these TVs, they generally support only a limited number of applications. Other types of applications (for example, games) generally require a user to connect an external device to their TV (for example, an Xbox™ or PlayStation™). Running a work-related program (for example, a spreadsheet) on a TV requires more computing power than other types of applications and more computing power than is generally available in a TV.

SUMMARY OF EMBODIMENTS

Some embodiments provide a method for performing external processing for a display device. An application is executed on the display device. Data is sent from the application to an external processor in direct communication with the display device, if the application requires additional processing capabilities than is available on the display device. Data is received from the external processor and the processed data is displayed on the display device.

Some embodiments provide a system for performing external processing on a display device including an external processor. The display device includes a processor configured to run an application and an artificial intelligence component in communication with the processor. The external processor is in direct communication with the display device and is configured to receive data from the application for processing, process the data, and send the processed data to the application. The artificial intelligence component is configured to coordinate transferring the data between the application and the external processor. The display device is further configured to display the processed data.

Some embodiments provide a non-transitory computer-readable storage medium storing a set of instructions for execution by a general purpose computer to perform external processing for a display device. The set of instructions include an executing code segment, a sending code segment, a receiving code segment, and a displaying code segment. The executing code segment executes an application on the display device. The sending code segment sends data from the application to an external processor in direct communication with the display device, if the application requires additional processing capabilities than is available on the display device. The receiving code segment receives data from the external processor. The displaying code segment displays the processed data on the display device.

BRIEF DESCRIPTION OF THE DRAWINGS

A more detailed understanding may be had from the following description, given by way of example in conjunction with the accompanying drawings, wherein:

FIGS. 3A and 3B are a flowchart of a method for performing external data processing for a display device.

DETAILED DESCRIPTION

A method, a device, and a non-transitory computer readable medium for performing external processing on a display device are presented. An application is executed on the display device. Data is sent from the application to an external processor in direct communication with the display device, if the application requires additional processing capabilities than is available on the display device. Data is received from the external processor and the processed data is displayed on the display device.

To exploit the technological convergence from personal computer (PC) to TV, the general purpose computing capabilities of a graphics processing unit (GPU) or an accelerated processing unit (APU) may be used to perform PC-level computations in the TV by hot plugging an external device containing the GPU or APU to the TV. In one implementation, the data to be processed may be read from a separate external device, such as a hard disk drive (HDD).

Figure 1:
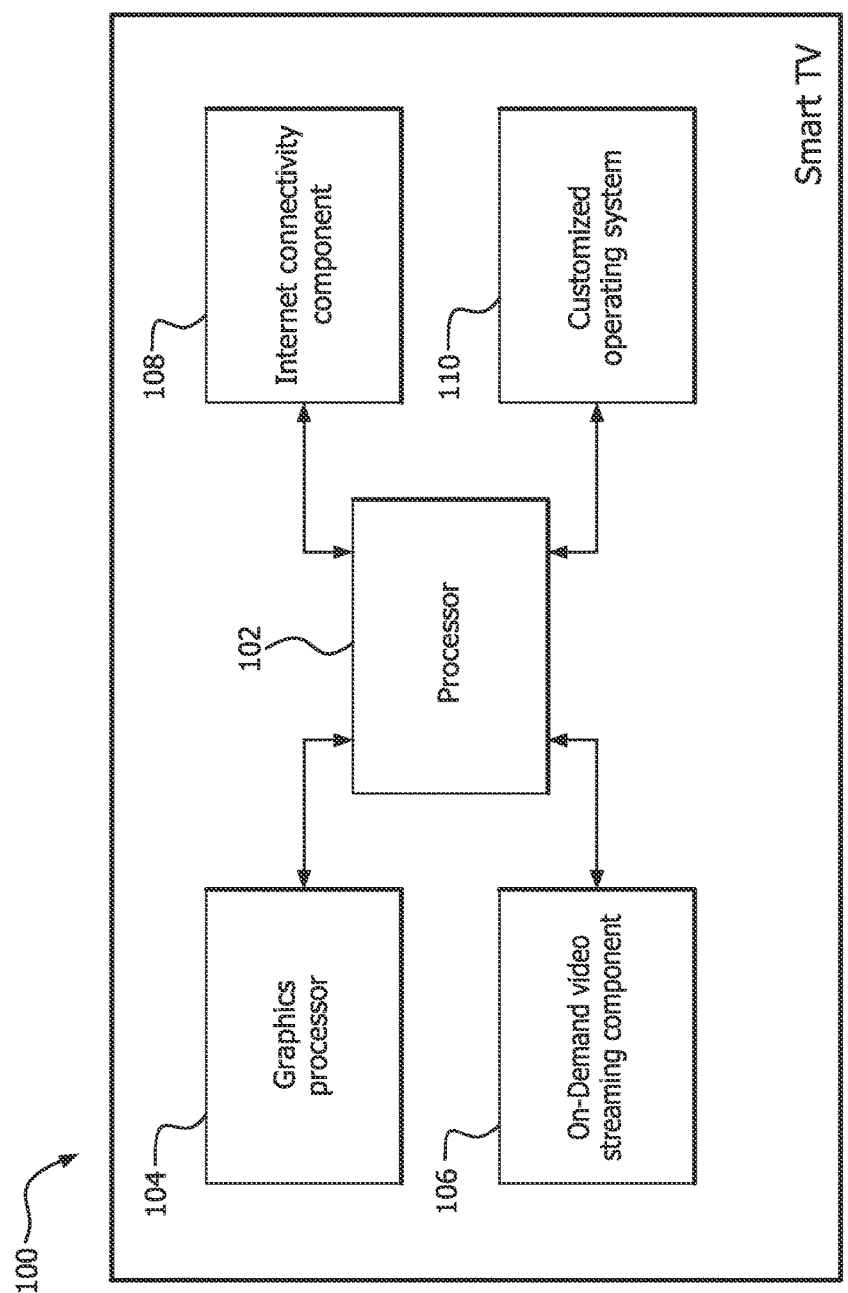
FIG. 1 is a block diagram of an example embodiment of a Smart TV.

Current Smart TVs do not have a high level of computing power, and are generally constrained to working with networked available content (for example, Internet-based content), which requires a relatively low level of computing power. FIG. 1 shows an example embodiment of a Smart TV 100. The Smart TV 100 includes a processor 102 which communicates with a graphics processor 104, an on-demand video streaming component 106, an Internet connectivity component 108, and a customized operating system (OS) 110. The on-demand video streaming component 106, the Internet connectivity component 108, and the customized OS 110 may be implemented in software, in hardware, or a combination thereof, as discrete components or as part of the processor 102 or graphics processor 104.

The components 102-108 in the Smart TV 100 are often lower-end components or have limited functionality, to manufacture the Smart TV 100 at a lower cost. For example, the graphics processor 104 may be a low-end graphics processor, and may not be capable of processing graphics for high-end applications with a high rendering speed. The on-demand video streaming component 106 may only be able to process a limited number of high definition video codecs, for example, H.264. The customized OS 110 limits the applications that the Smart TV 100 may run to applications that are designed for the customized OS 110. A user cannot switch to a different OS or run additional applications, unless the applications are specifically designed to be run on the Smart TV 100.

The applications that may be run on the Smart TV 100 are generally limited in terms of their computing power requirements and are often pre-installed by the manufacturer, such that additional applications may not be able to be installed and run on the Smart TV 100. Current solutions for utilizing external processing (for example, on-demand graphics processing in the cloud) require a high-bandwidth Internet connection to be most effective. Such a high-bandwidth connection may not be available at all times, and in some instances, may not be sufficient to provide the best results for the user (for example, a high latency may adversely affect game play).

Figure 2:
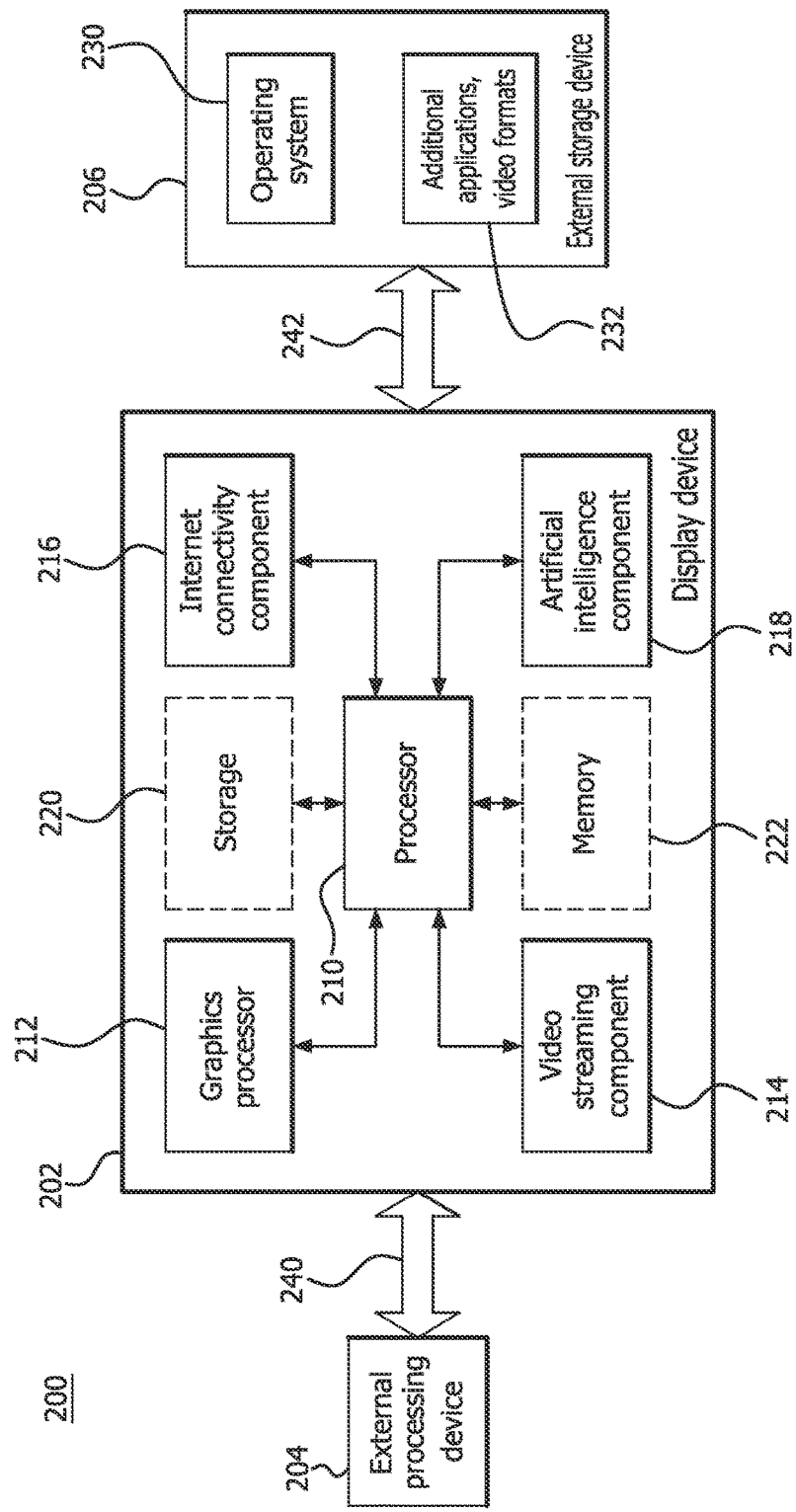
FIG. 2 is a block diagram of a system for external data processing for a display device.

FIG. 2 is a block diagram of a system 200 for external processing for a display device. The system 200 includes a display device 202, an external processing device 204, and an external storage device 206. The external storage device 206 may be any kind of external storage device, including, but not limited to, a hard disk drive (HDD), a solid state drive (SSD), or any other non-transitory computer readable medium.

The display device 202 includes a processor 210, a graphics processor 212, a video streaming component 214, an Internet connectivity component 216, an artificial intelligence component 218, an optional storage 220, and an optional memory 222. The video streaming component 214, the Internet connectivity component 216, and the artificial intelligence component 218 may be implemented in software, hardware, or a combination of software and hardware without affecting the operation of the component. The external storage device 206 contains an operating system (OS) 230 and additional applications and/or codecs 232 for accessing different video formats.

The display device 202 communicates with the external processing device 204 via a connector 240. In one embodiment, the connector 240 is a universal serial bus (USB) connector. In another embodiment, the connector 240 is an external graphics platform (XGP) connector. Alternatively (not shown in FIG. 2), the connector 240 may be a short-range wireless high-bandwidth connection, such as (but not limited to), wireless USB.

The display device 202 communicates with the external storage device 206 via a connector 242. The connector 242 may be a USB connector, or any other type of connector compatible with external storage devices that allows the external storage device 206 to be "hot-pluggable" with the display device 202.

In one embodiment, the external processing device 204 functions as a hot-pluggable component. In one embodiment, the external processing device 204 includes a GPU or an APU configured for enhanced performance and graphics quality. The external processing device 204 includes more processing capability than the graphics processor 212 in the display device 202. The external processing device 204 does not only need to be used by the display device 202 for its graphics processing capabilities, and may be used for general computing purposes (for example, general-purpose computing on graphics processing units, GPGPU). In another embodiment, the external processing device 204 may include any type of processor and may be used to supplement the computing capabilities of the display device 202.

In one embodiment, the video streaming component 214 provides support for any video format, irrespective of the video formats that are hard-coded into the display device 202.

The artificial intelligence component 218 is configured to recognize the input of a computation or an application provided from the external storage device 206 to the display device 202 and to enable the external processing device 204 to perform the necessary computations and/or rendering required by the application. The artificial intelligence component 218 is configured to automatically recognize the hot-plugged external processing device 204 and loads the relevant device drivers such that the display device 202 can utilize the capabilities of the external processing device 204.

The artificial intelligence component 218 may function like a low-level boot loader to load the OS 230 from the external storage device 206 and then access any applications 232 stored on the external storage device 206. The artificial intelligence component 218 can detect what content needs to be loaded from the external storage device 206 and what it has to pass to the external processing device 204 for processing. The external processing device 204 is responsible for driving the hardware, passing instructions to the artificial intelligence component 218 as to what content needs to be fetched from the external storage device 206.

The artificial intelligence component 218 decides what tasks to perform and the best manner for executing those tasks based on the hardware present, including using the external processing device 204. The artificial intelligence component 218 decides what parameters it has to pass to the external processing device 204. The external processing device 204 processes the data and passes the processed data back to the display device 202. The display device 202 decides how to display the data. The display device 202 needs to have a moderate level of intelligence (for example, in the artificial intelligence component 218) to be able to coordinate all of this activity.

In one embodiment, the OS 230 is independent from any OS installed or preferred by the display device manufacturer. The artificial intelligence component 218 is configured to load any OS detected on the external storage device 206. The additional applications 232 provide support for any number of applications.

Figure 3B:
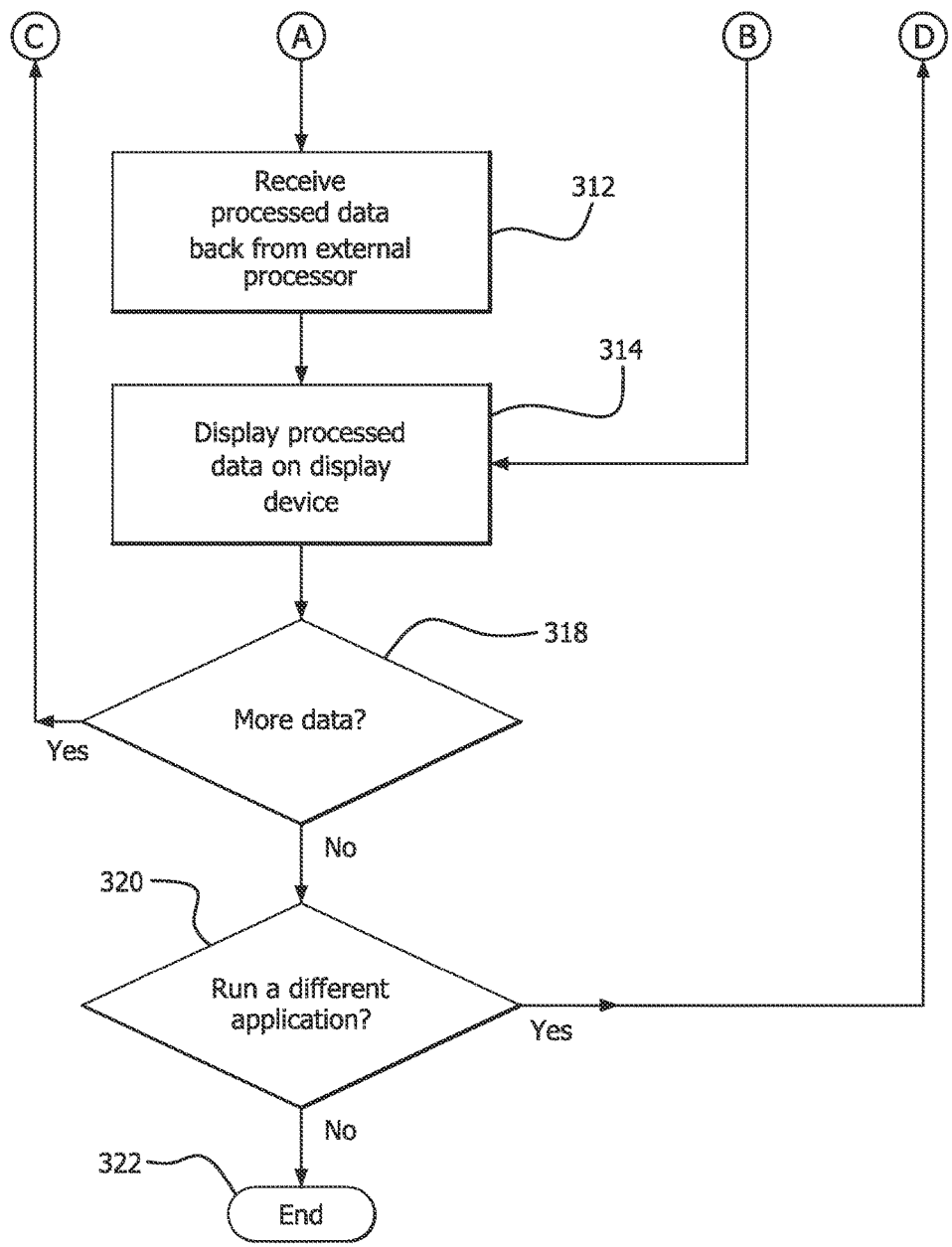

FIGS. 3A and 3B are a flowchart of a method 300 for performing external data processing for a display device. The display device detects whether an external processor (or processing device) and an external storage device are connected to the display device (step 302). An operating system (OS) may be loaded from the external storage device onto the display device (step 304). It is noted that this step may be optional, if an application to be run on the display device does not require a different OS for execution than the OS currently running on the display device.

An application is loaded from the external storage device onto the display device (step 306). A determination is made whether the display device needs additional processing capability to run the application (step 308). If the additional processing capability is needed, then the application sends the data to the external processor or processing device for processing (step 310). The application receives the processed data back from the external processor or processing device (step 312) and displays the processed data on the display device (step 314).

If the display device does not need additional processing capability to run the application (step 308), then the data from the application is processed by the display device (step 316) and displays the processed data on the display device (step 314).

After the processed data is displayed on the display device, a determination is made whether the application has more data to process (step 318). If the application has more data to process, then a determination is made whether the display device needs additional processing capability to run the application (step 308) as described above. In this manner, the application can access the external processor or processing device on an as-needed basis, and does not have to send all of its data to the external processor or processing device for processing. In another embodiment, if the application requires use of the external processor or processing device, it will send all of its data to the external processor or processing device for processing.

If the application does not have any more data to process (step 318), then a determination is made whether another application has been selected to run on the display device (step 320). If another application has been selected to run on the display device, then the selected application is loaded from the storage device onto the display device (step 306) as described above. If no other application has been selected to run on the display device (step 320), then the method terminates (step 322).

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a non-transitory computer-readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing external processing for a display device, comprising:
   loading an application and an operating system (OS) onto the display device from an external storage device, wherein the OS loaded onto the display device is different from an OS already installed on the display device;
   executing the application on the display device;
   determining whether the application requires additional processing capabilities than is available on the display device;
   in response to determining that the application requires additional processing capabilities than is available on the display device, sending all data from the application to an external processor for processing and return of processed data, the external processor being in direct communication with the display device;
   processing all data from the application loaded from the external storage device using an internal processor of the display device in response to determining that the application does not require additional processing capabilities than is available on the display device;
   receiving any processed data from the external processor; and
   displaying the processed data on the display device.

2. The method according to claim 1, wherein the external processor is contained in a device that is hot-pluggable into the display device to establish a connection between the external processor and the display device.

3. The method according to claim 1, wherein the external storage device includes an external hard disk drive.

4. A system for performing external processing on a display device, the system comprising:
   an external storage device connected to the display device, the external storage device including an application and an operating system (OS) to be loaded onto the display device, wherein the OS to be loaded onto the display device is different from an OS already installed on the display device;
   the display device, including:
     an internal processor;
     an artificial intelligence component in communication with the processor, the artificial intelligence component being configured to:
     determine whether the application requires additional processing capabilities than is available on the display device,
     in response to determining that the application requires additional processing capabilities than is available on the display device, send all data from the application to an external processor for processing and return of processed data,
     processing all data for the application loaded from the external processing device using the internal processor in response to detecting that the application does not require additional processing capabilities than is available on the display device;
   the external processor in direct communication with the display device, the external processor configured to:
     receive data from the application for processing;
     process the data; and
     send the processed data to the application;
   wherein the display device is further configured to display the processed data.

5. The system according to claim 4, wherein the external processor is contained in an external device that is hot-pluggable into the display device to establish a connection between the external processor and the display device.

6. The system according to claim 5, wherein the external device includes a Universal Serial Bus interface.

7. The system according to claim 5, wherein the external device includes an external graphics platform interface.

8. The system according to claim 4, wherein the external storage device includes an external hard disk drive.

9. A non-transitory computer-readable storage medium storing a set of instructions for execution by a general purpose computer to perform external processing for a display device, the set of instructions comprising:
   a loading code segment for loading an application and an operating system (OS) onto the display device from an external storage device, wherein the OS loaded onto the display device is different from an OS already installed on the display device;
   an executing code segment for executing an application on the display device;

a determining code segment for determining whether the application requires additional processing capabilities than is available on the display device;

a sending code segment for sending all data from the application to an external processor for processing and return of processed data in response to determining that the application requires additional processing capabilities than is available on the display device, the external processor being in direct communication with the display device;

an internal processing code segment for processing all data from the application loaded from the external storage device using an internal processor of the display device in response to determining that the application does not require additional processing capabilities than is available on the display device;

a receiving code segment for receiving any processed data from the external processor; and a displaying code segment for displaying the processed data on the display device.

10. The non-transitory computer-readable storage medium according to claim 9, wherein the instructions are hardware description language (HDL) instructions used for the manufacture of a device.

11. The method of claim 1, further comprising:
after the processed data is displayed on the display device, determining whether the application has additional data to process;

sending the data to the external processing device for processing in response to determining that the application has additional data to process; and processing the data using an internal processor of the display device responsive to determining that the application has additional data to process.

12. The method of claim 1, further comprising:
determining whether another application on the external storage device has been selected to run on the display device;

in response to determining that another application on the external storage device has been selected, loading the other application from the external storage device onto the display device; and running the other application.

13. The method of claim 1, wherein the external processor is configured to process graphics data and perform general computations.

14. The method of claim 1, wherein the OS already installed on the display device is a customized OS that only runs applications designed for the customized OS.

* * * * *